(12) United States Patent
Kokot, Jr. et al.

(10) Patent No.: US 11,479,120 B2
(45) Date of Patent: Oct. 25, 2022

(54) DRIVELINE SYSTEM FOR CONNECTING AN ON-VEHICLE PTO SHAFT TO ON-VEHICLE AUXILIARY EQUIPMENT AND VEHICLES EQUIPPED THEREWITH

(71) Applicant: Vanair Manufacturing Inc., Michigan City, IN (US)

(72) Inventors: Ralph Kokot, Jr., Crown Point, IN (US); Michael Crumley, Three Oaks, MI (US); Charles Lorance, Galien, MI (US)

(73) Assignee: Vanair Manufacturing, Inc., Michigan City, IN (US)

( * ) Notice: Subject to any disclaimer, the term of this patent is extended or adjusted under 35 U.S.C. 154(b) by 0 days.

(21) Appl. No.: 17/410,518

(22) Filed: Aug. 24, 2021

(65) Prior Publication Data

US 2022/0055476 A1     Feb. 24, 2022

Related U.S. Application Data

(60) Provisional application No. 63/069,324, filed on Aug. 24, 2020.

(51) Int. Cl.
*B60K 25/06*     (2006.01)

(52) U.S. Cl.
CPC .................................. *B60K 25/06* (2013.01)

(58) Field of Classification Search
None
See application file for complete search history.

(56) References Cited

U.S. PATENT DOCUMENTS

| | | | |
|---|---|---|---|
| 4,392,694 A * | 7/1983 | Reynolds | B60K 17/24 384/536 |
| 9,982,707 B2 * | 5/2018 | Nicholas | F16C 19/26 |
| 11,156,253 B2 * | 10/2021 | Dutkiewicz | F16D 3/848 |
| 2002/0139603 A1 * | 10/2002 | Aiken | F16F 15/005 180/381 |

FOREIGN PATENT DOCUMENTS

| | | | | |
|---|---|---|---|---|
| DE | 202017104175 U1 * | 9/2017 | | B60K 17/24 |
| DE | 112017004035 T5 * | 5/2019 | | F16D 1/116 |
| DE | 112007003695 B4 * | 10/2021 | | F16D 1/0858 |

* cited by examiner

*Primary Examiner* — Faye M Fleming
(74) *Attorney, Agent, or Firm* — Hartman Global IP Law; Gary M. Hartman; Domenica N. S. Hartman

(57) ABSTRACT

A driveline system for connecting an on-vehicle PTO shaft to on-vehicle auxiliary equipment installed on a vehicle. The driveline system is adapted for mounting to an undercarriage of a vehicle that includes a transmission, a PTO shaft connected to the transmission near a forward end of the transmission, and auxiliary equipment mounted to the undercarriage aft of the transmission. The driveline system includes a first shaft connected to the PTO shaft via a first U-joint, a second shaft connected to the auxiliary equipment via a second U-joint and to the first shaft via a third U-joint, a bearing installed on the first shaft for supporting the first and second shafts adjacent the third U-joint, and a bracket that is attached to the transmission rearward of the PTO shaft.

10 Claims, 6 Drawing Sheets

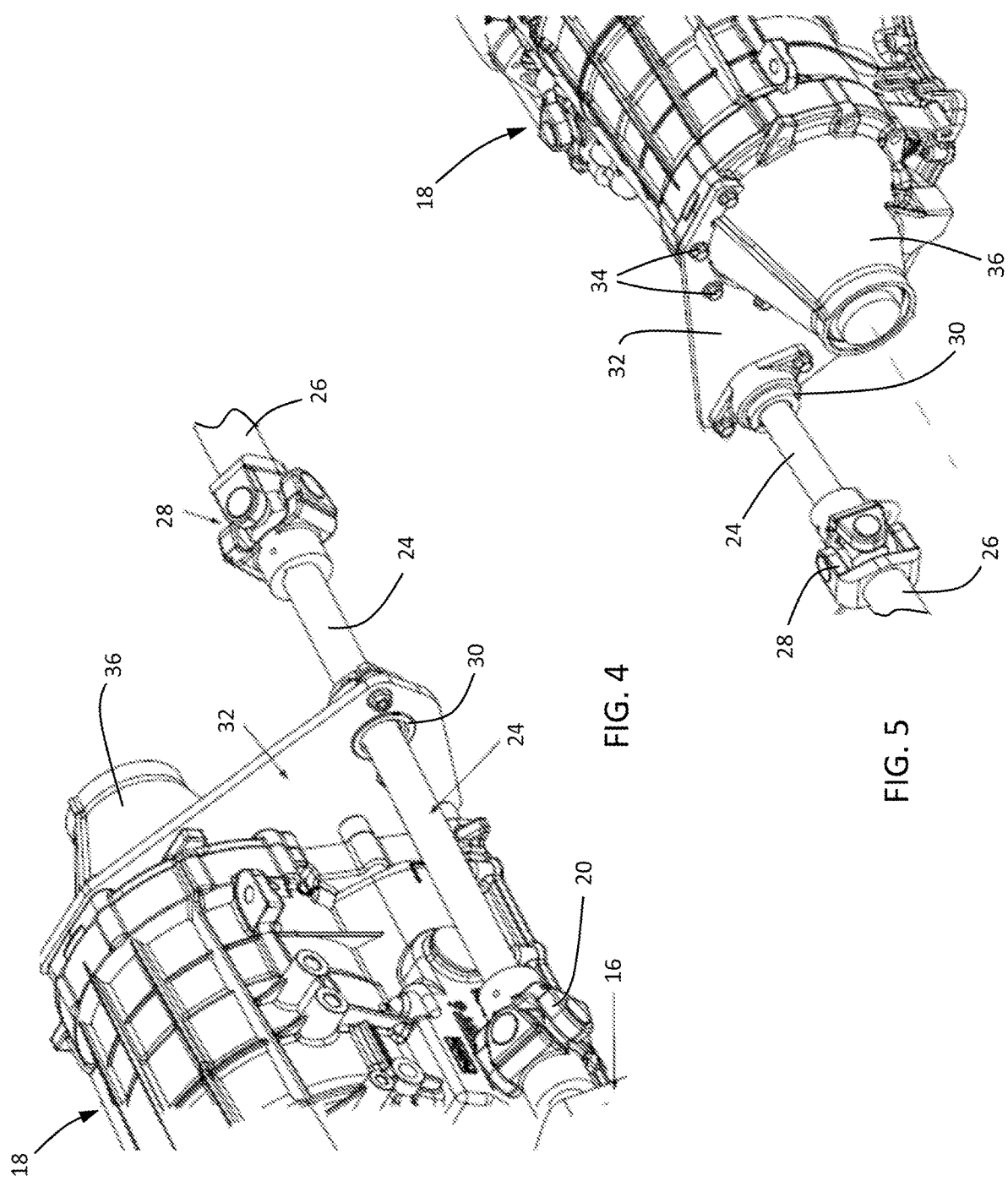

DRIVELINE SYSTEM FOR CONNECTING
AN ON-VEHICLE PTO SHAFT TO
ON-VEHICLE AUXILIARY EQUIPMENT
AND VEHICLES EQUIPPED THEREWITH

CROSS-REFERENCE TO RELATED
APPLICATIONS

This application claims the benefit of U.S. Provisional Application No. 63/069,324 filed Aug. 24, 2020, the contents of which are incorporated herein by reference.

BACKGROUND OF THE INVENTION

The present invention generally relates to systems and components adapted for installation on a vehicle, and more particularly to a driveline system for connecting an on-vehicle power take-off (PTO) shaft to on-vehicle auxiliary equipment installed on a vehicle, nonlimiting examples of which include utility, service, emergency, and military vehicles.

Utility, service, emergency, and military vehicles are often equipped with various auxiliary systems, such as but not limited to electrical, hydraulic, and pneumatic systems, and therefore benefit from on-vehicle (on-board) auxiliary equipment adapted to provide the energy needed to operate such systems. On-vehicle auxiliary equipment such as, but not limited to, power generators, air compressors, fluid (hydraulic, including oil and water) pumps, blowers, etc., may utilize mechanical energy as their power source or input, in which case the auxiliary equipment are often powered by a PTO shaft driven by the engine of the vehicle.

When mounted on a utility, service, emergency, or military vehicle, compressors, pumps, generators, and other auxiliary equipment are typically mounted separately from and independently of their power source. For example, an air compressor is usually mounted in a location beneath a vehicle frame that allows its outlet ports and fittings to be accessible by an operator standing alongside the vehicle, necessitating that power from the vehicle engine is transmitted from a PTO shaft to the compressor via drive shafts and/or belts. As particular examples, single-piece (a single drive shaft) and three-piece (three drive shafts connected in series) driveline systems have been utilized for this purpose. Potential drawbacks of single-piece driveline systems include limitations to the horsepower they may be capable of transmitting, flexing along the length of the single shaft, and stress and wear on the PTO and its bearings. Potential drawbacks of three-piece driveline systems include the requirement for frame modifications, installation time, expense and, if not installed by sufficiently skilled personnel, risk of vibrations and oscillations due to shaft misalignment. As such, the addition of on-vehicle auxiliary equipment brings technical challenges, including performance and endurance issues and the desire to minimize clutter within the vehicle undercarriage.

BRIEF DESCRIPTION OF THE INVENTION

The present invention provides a driveline system for connecting an on-vehicle PTO shaft to on-vehicle auxiliary equipment installed on a vehicle.

According to a first aspect of the invention, a driveline system is provided for mounting to an undercarriage of a vehicle that includes a transmission, a PTO shaft connected to the transmission near a forward end of the transmission, and auxiliary equipment mounted to the undercarriage aft of the transmission. The driveline system includes a first shaft connected to the PTO shaft via a first U-joint, a second shaft connected to the auxiliary equipment via a second U-joint and to the first shaft via a third U-joint, a bearing installed on the first shaft for supporting the first and second shafts adjacent the third U-joint, and a bracket that is attached to the transmission rearward of the PTO shaft.

Another aspect of the invention includes vehicles on which the driveline system is installed, including but not limited to utility, service, emergency and military vehicles.

Aspects and advantages of this invention will be appreciated from the following detailed description.

BRIEF DESCRIPTION OF THE DRAWINGS

FIGS. 4, 5, and 6 are fragmentary perspective views of certain components of the driveline system installed on the undercarriage shown in FIG. 1.

Figure 1:
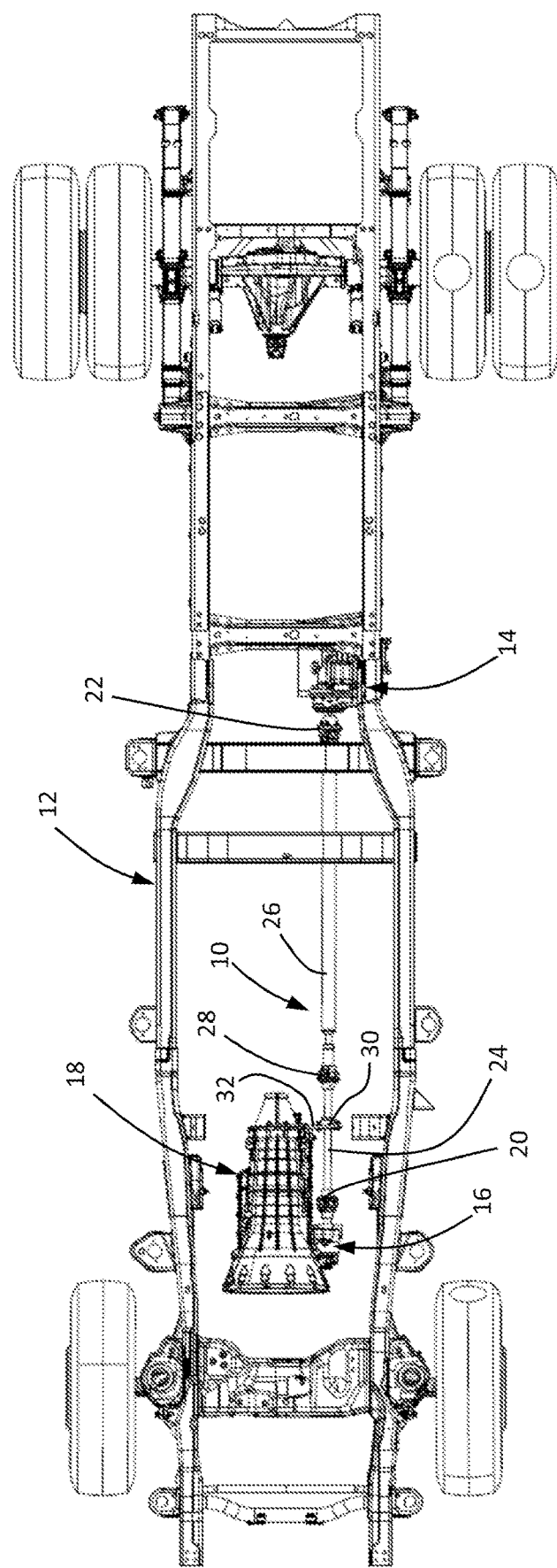
FIGS. 1 and 2 are plan and side views, respectively, representing an undercarriage and transmission of a vehicle on which a driveline system is installed in accordance with a nonlimiting embodiment of this invention.
Figure 2:
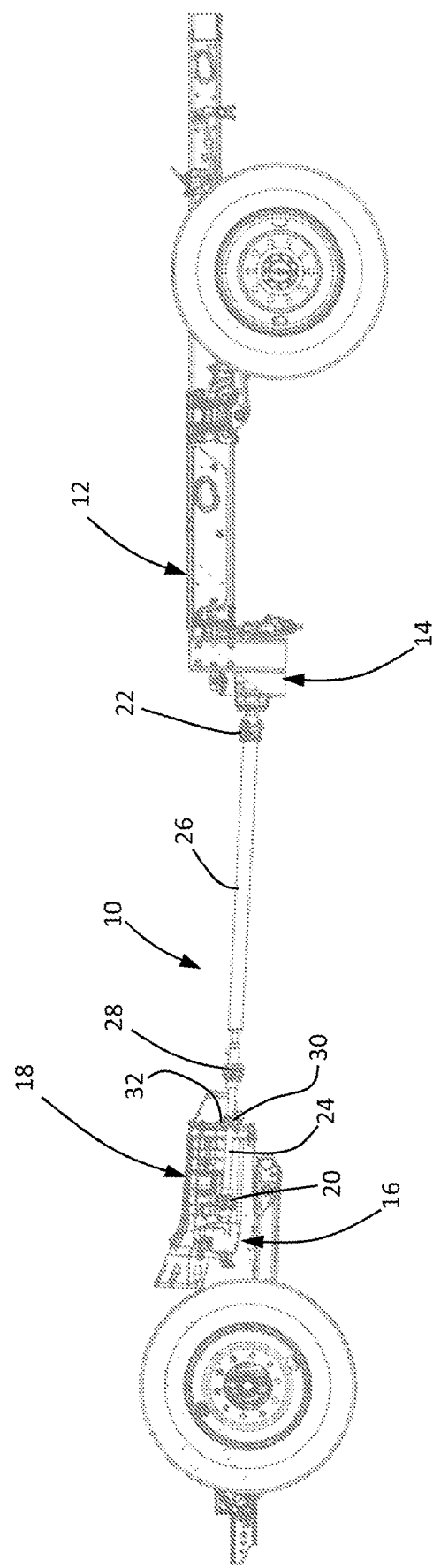

DETAILED DESCRIPTION OF THE
INVENTION

The intended purpose of the following detailed description of the invention and the phraseology and terminology employed therein is to describe what is shown in the drawings, which include the depiction of one or more nonlimiting embodiments of the invention, and to describe certain but not all aspects of what is depicted in the drawings, including the embodiment(s) depicted in the drawings. The following detailed description also identifies certain but not all alternatives of the embodiment(s) depicted in the drawings. Therefore, the appended claims, and not the detailed description, are intended to particularly point out subject matter regarded as the invention, including certain but not necessarily all of the aspects and alternatives described in the detailed description.

FIGS. 1 through 6 represent a nonlimiting example of a driveline system 10 that is suitable for installation on a vehicle, as nonlimiting examples, the undercarriage 12 of a utility, service, emergency, or military vehicle, by which auxiliary equipment 14, as nonlimiting examples, a compressor, pump, generator, etc., can be separately and independently mounted relative to its power source, in this case, a PTO shaft 16 coupled to a transmission 18 driven by the engine (not shown) of the vehicle.

To facilitate the description provided below of the embodiment represented in the drawings, relative terms, including but not limited to, "longitudinal," "lateral," "front," "rear," "side," "forward," "rearward" ("aft"), etc., may be used in reference to the orientation of the driveline system 10 as installed on the undercarriage 12 as represented in FIGS. 1, 2, and 4 through 6. All such relative terms are intended to indicate the construction, installation and operation of the driveline system 10 and therefore help to define the scope of the invention.

The driveline system 10 is shown in FIGS. 1 through 6 as mounted within the undercarriage 12 and with its forward end connected to the PTO shaft 16, which is associated with the vehicle transmission 18. The driveline system 10 extends rearward through the undercarriage 12 to the auxiliary equipment 14. The driveline system 10 is shown as being directly coupled to the PTO shaft 16 via a first U-joint 20, and directly coupled to the auxiliary equipment 14 via a second U-joint 22. The PTO shaft 16 is driven by an engine (not shown) of the vehicle, as would be conventional for many types of utility, service, emergency and military vehicles.

Figure 7:
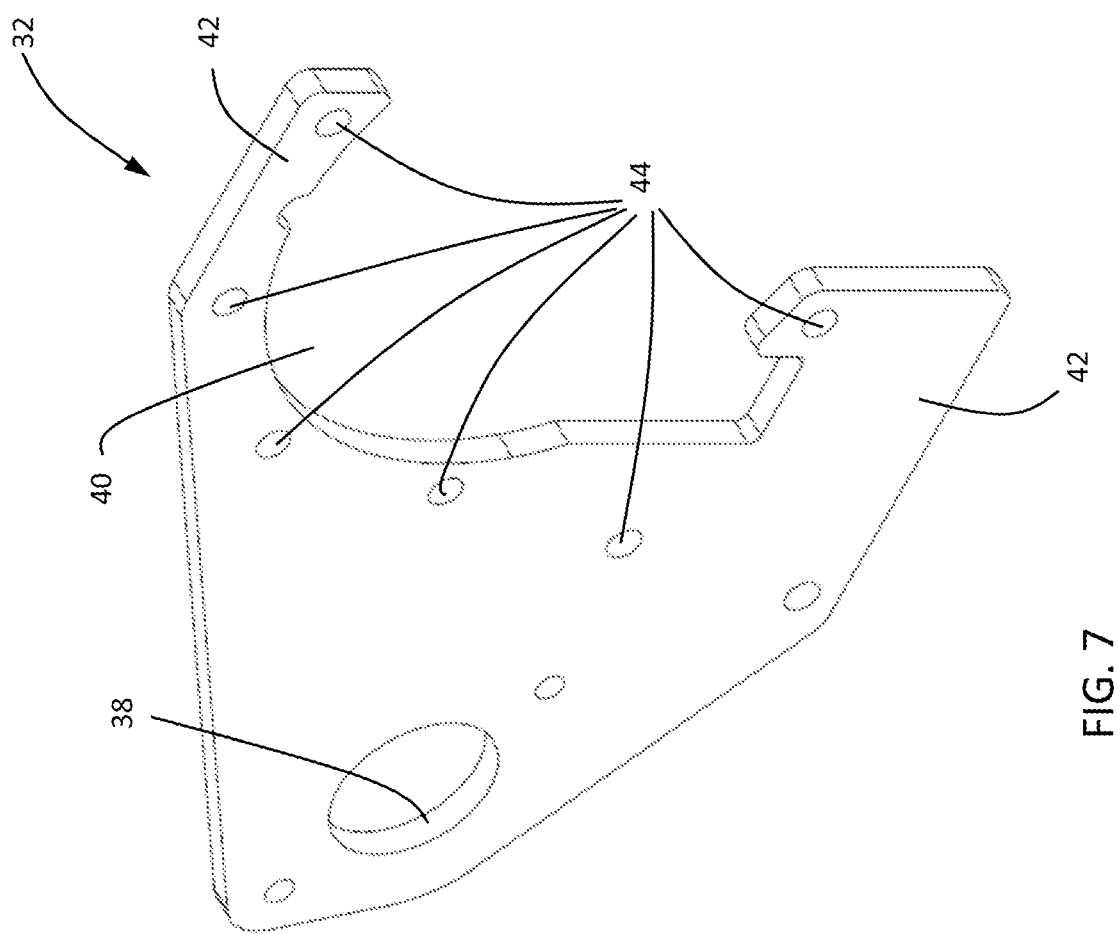
FIG. 7 depicts various views of a bracket utilized in the driveline system of FIGS. 1 through 6.

The driveline system 10 is referred to herein as a two-piece driveline system 10 on the basis that only two shafts are utilized: a first shaft 24 is connected to the PTO shaft 16 via the first U-joint 20, and a second shaft 26 is connected to the auxiliary equipment 14 via the second U-joint 22 and to the first shaft 24 via a third U-joint 28. The second shaft 26 may have a hollow construction to minimize its weight, whereas the first shaft 24 is preferably a solid (not hollow) shaft to promote its stiffness and rigidity. The third U-joint 28 serves as a mechanical connection between the first and second shafts 24 and 26. The first shaft 25 is supported with a bearing 30 mounted to a bracket 32 that is directly attached to the transmission 18 rearward of the PTO shaft 16. The bearing 30 is a high speed ("HS") bearing, indicating that the bearing 30 is rated for relatively high rotational speeds. A nonlimiting embodiment of the bracket 32 is shown in greater detail in FIG. 7 as including an opening 38 in which the bearing 30 can be mounted, a recess or cavity 40 that defines a pair of arms 42 so that the bracket 32 can be mounted to partially surround a portion of the transmission 18, and bolt holes 44 for mounting the bracket 32 to the transmission 18.

The first shaft 24 passes through the bearing 30 and is locked to and supported by the bearing 30 at a point roughly midway or, as represented in the drawings, slightly aft of midway along the longitudinal length of the first shaft 24, such that a majority of the longitudinal length of the first shaft 24 is supported by and between the first U-joint 20 and the bearing 30. This arrangement helps to ensure proper alignment, minimizes vibration, and stabilizes the first shaft 24 when rotating. In the embodiment shown, the PTO shaft 16 and its U-joint 20 are located adjacent the forward end of the transmission 18, i.e., closer to the forward extremity of the transmission 18 than to the rearward extremity of the transmission 18, and the bearing 30 and its bracket 32 are rigidly mounted to the transmission 18 at or adjacent the rearward end of the transmission 18, i.e., closer to the rearward extremity of the transmission 18 than to the forward extremity of the transmission 18. In this manner, the first shaft 24 is rigidly fixed to the transmission 18 so that the entire first shaft 24 moves with the transmission 18 (and engine) as the transmission 18 moves/rocks due to the application of torque, thus maintaining proper alignment of the driveline system 10 relative to the transmission 18, undercarriage 12, and its components. In particular, proper alignment of the driveline system 10 is ensured by supporting the first shaft 24 at two locations alongside the transmission 18: at a location (the first U-joint 20) connecting the forward end of the first shaft 24 to the PTO shaft 16 at or adjacent the forward end of the transmission 18, and at the bearing 30 at or adjacent the aft end of the first shaft 24. This configuration helps to negate angular movement of the system 10 relative to the undercarriage 12 and other vehicle components. In the embodiment shown, the position of the first shaft 24 is fixed relative to the transmission 18 so that the longitudinal axes of the transmission 18 and shaft 24 are roughly parallel, though it is foreseeable that in other embodiments this parallel arrangement might not be the case.

Figure 3:
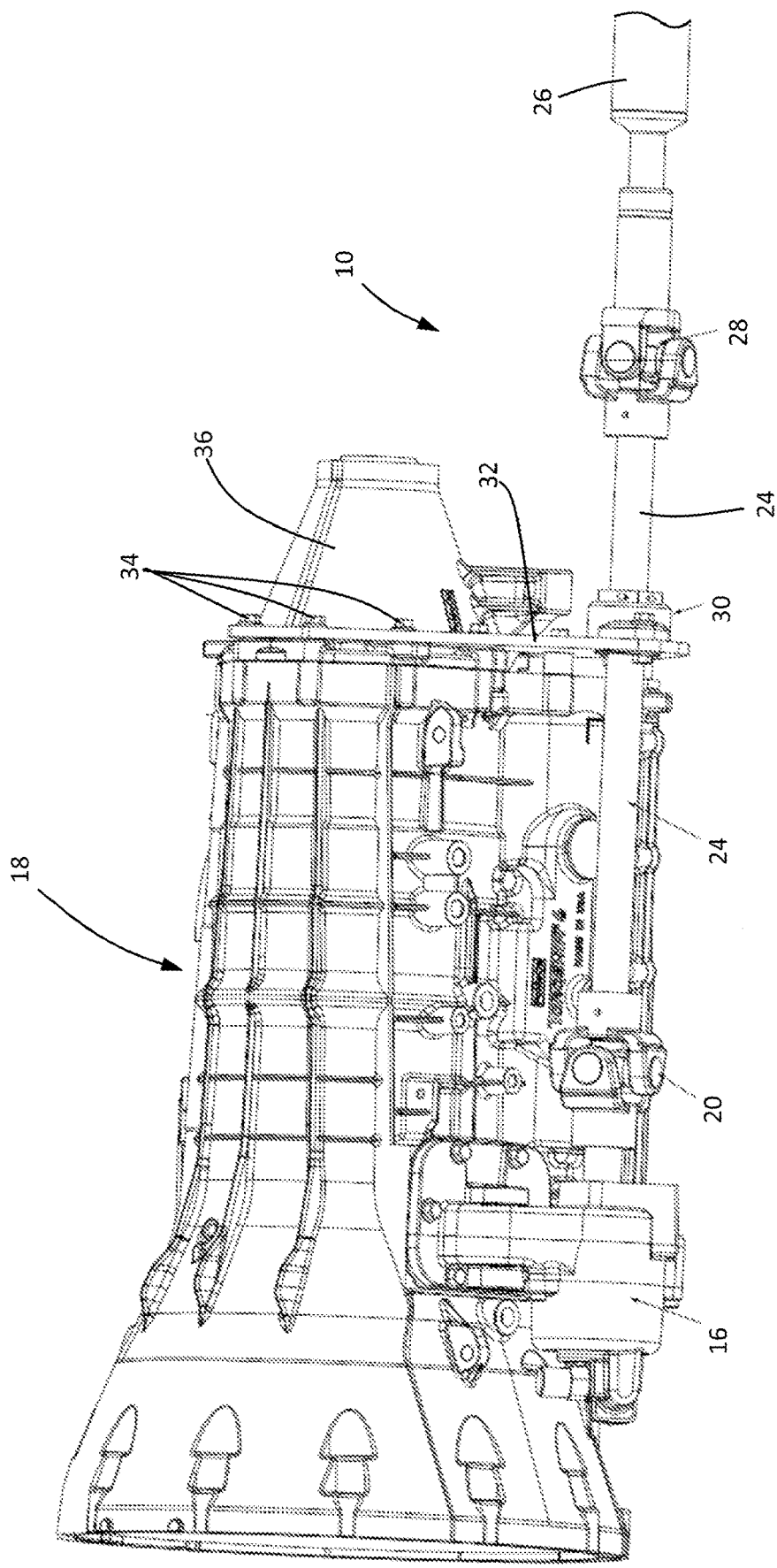
FIG. 3 is an isolated fragmentary side view of certain components of the driveline system of FIG. 1 and its connection to a PTO shaft of the transmission.
Figure 6:
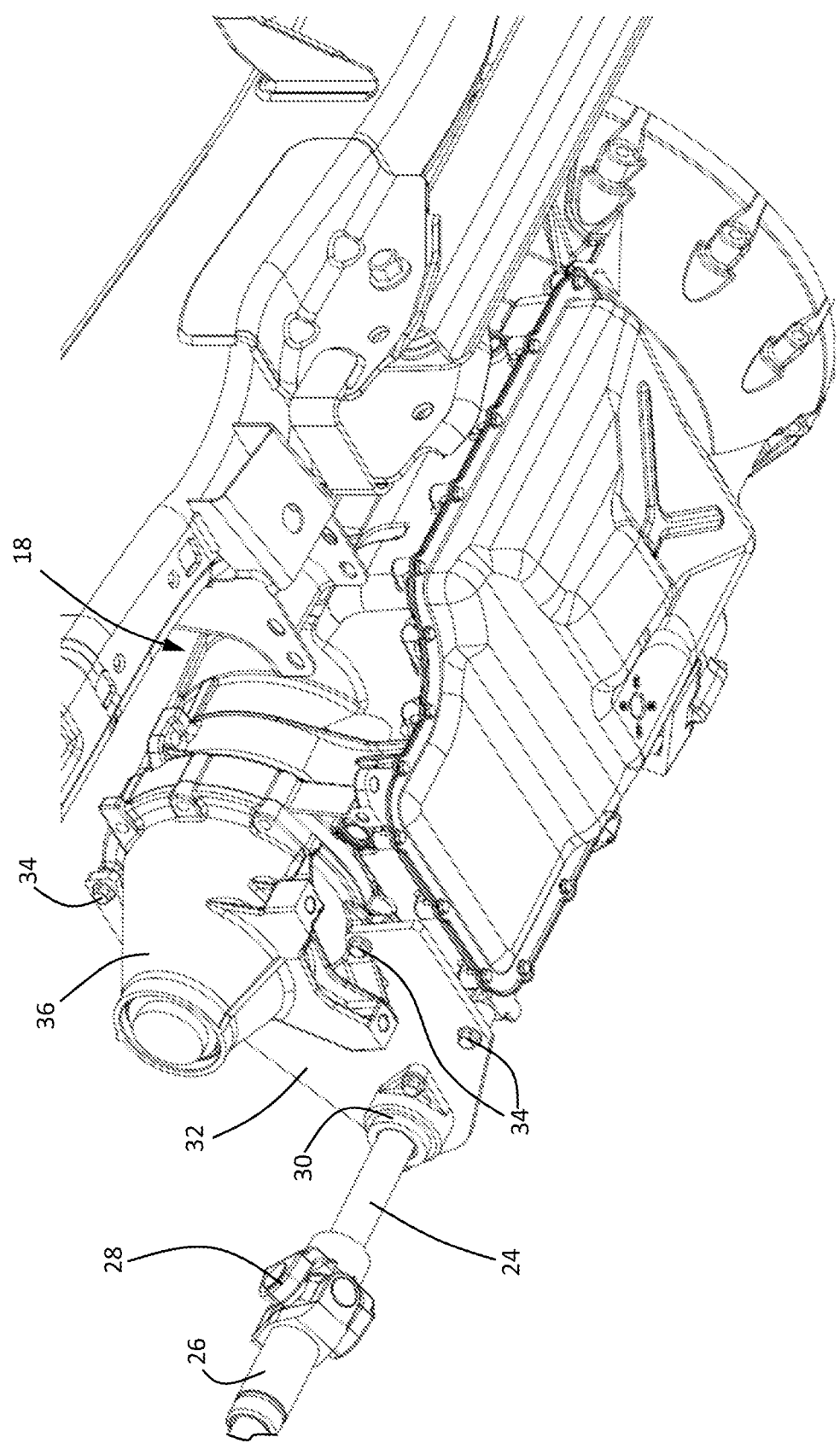

As a result of utilizing two shafts 24 and 26, with the first shaft 24 rigidly secured at its forward end to or near the forward end of the transmission 18 and rigidly secured adjacent its aft end to or near the aft end of the transmission 18 so that the first shaft 24 remains parallel to and moves with the transmission 18, the driveline system shown in the drawings is capable of addressing certain shortcomings of single-piece and three-piece driveline systems of the prior art. The driveline system 10 does not impose additional limitations to the horsepower it is capable of transmitting, resists flexing along its length, and reduces stress and wear on the PTO shaft 16 and its bearings as compared to single-piece driveline systems. The driveline system 10 does not require frame modifications, can be installed at relatively little time and expense, and has a reduced risk of vibrations and oscillations due to shaft misalignment, which can be potential drawbacks of three-piece driveline systems. The two-piece driveline system 10 shown in the drawings is installed with three U-joints 20, 22, and 28 and a simple rigid attachment (bracket 32) to the transmission 18. As evident from FIGS. 3 and 6, the bracket 32 can be mounted to the transmission 18 without any modifications to the transmission 18. As a nonlimiting example, FIGS. 3 and 6 represent the bracket 32 mounted with bolts 34 that also secure the output shaft housing 36 to the aft end of the transmission case. By securing the first shaft 24 only to the transmission 18, the need to drill the frame of the undercarriage 12 is avoided, the risk of unwanted vibrations and oscillations is reduced, and less expertise and specialized tools are required to mount the driveline system 10.

Suitable constructions and materials for the first and second shafts 24 and 26 and U-joints 20, 22, and 24 are within the expertise of those having ordinary skill in the art, and as such will not be discussed in further detail. However, the intent is for the shaft 24 to be rigidly mounted to the transmission 18 so that the shaft 24 moves with, and not relative to, the transmission 18, requiring that the shaft 24 is coupled only to the transmission 18 at locations adjacent the forward and aft ends of the transmission 18, and with the coupling (U-joint 22) between the first and second shafts 24 and 26 located aft of the rigid attachment (bearing 30 and bracket 32) between the first shaft 24 and the aft end of the transmission 18.

While the invention has been described in terms of a particular embodiment, it should be apparent that alternatives could be adopted by one skilled in the art. For example, the driveline system 10 and its components could differ in appearance and construction from the embodiment described herein and shown in the drawings, functions of certain components of the driveline system 10 could be performed by components of different construction but capable of a similar (though not necessarily equivalent) function, and various materials could be used in the fabrication of the driveline system 10 and/or its components. As such, it should be understood that the above detailed description is intended to describe the particular embodiment represented in the drawings and certain but not necessarily all features and aspects thereof, and to identify certain but not necessarily all alternatives to the represented embodiment and described features and aspects thereof. As a nonlimiting example, the invention encompasses additional or alternative embodiments in which one or more features or aspects of the disclosed embodiment could be eliminated. Accordingly, it should be understood that the invention is not necessarily limited to any embodiment described herein or illustrated in the drawings, and that the purpose of the above detailed description and the phraseology and terminology employed therein is to describe the illustrated embodiment and not necessarily to serve as limitations to the scope of the invention. Therefore, the scope of the invention is to be limited only by the claims.

The invention claimed is:

1. A driveline system adapted for mounting to an undercarriage of a vehicle comprising a transmission, a PTO shaft connected to the transmission near a forward end of the transmission, and auxiliary equipment mounted to the undercarriage aft of the transmission, the driveline system comprising:
   a first shaft connected to the PTO shaft via a first U-joint;
   a second shaft connected to the auxiliary equipment via a second U-joint and to the first shaft via a third U-joint;
   a bearing installed on the first shaft for supporting the first and second shafts adjacent the third U-joint; and
   a bracket that is attached to the transmission rearward of the PTO shaft.

2. The driveline system according to claim 1, wherein the first shaft is a solid shaft.

3. The driveline system according to claim 1, wherein the first shaft passes through the bearing and is locked to the bearing at a point midway or aft of midway along a longitudinal length of the first shaft between the first U-joint and the third U-joint.

4. The driveline system according to claim 3, wherein a majority of the longitudinal length of the first shaft is supported by and between the first U-joint and the bearing.

5. The driveline system according to claim 1, wherein the bracket is mounted to the transmission so that the first shaft moves with, and not relative to, the transmission as the transmission moves due to application of torque to maintain alignment of the driveline system relative to the transmission.

6. The driveline system according to claim 1, wherein the first shaft is supported at two locations alongside the transmission, a first of the two locations being at the PTO shaft adjacent the forward end of the transmission, and a second of the two locations being at the bearing adjacent the aft end of the first shaft.

7. The driveline system according to claim 1, wherein the transmission and the first shaft have longitudinal axes that are parallel to each other.

8. The driveline system according to claim 1, wherein the auxiliary system is an on-vehicle power generator, an air compressor, a fluid pump, or a blower.

9. The driveline system according to claim 1, wherein the driveline system is mounted to an undercarriage of a vehicle.

10. The vehicle to which the driveline system of claim 9 is mounted, wherein the vehicle is chosen from the group consisting of utility, service, emergency and military vehicles.

* * * * *